US012387610B2

(12) United States Patent
Roy et al.

(10) Patent No.: US 12,387,610 B2
(45) Date of Patent: Aug. 12, 2025

(54) HYBRID ELECTRIC ENGINE POWER DISTRIBUTION

(71) Applicant: RTX Corporation, Farmington, CT (US)

(72) Inventors: Arnab Roy, West Hartford, CT (US); Marc J. Muldoon, Marlborough, CT (US); Neil Terwilliger, Meridan, CT (US); Nancy Poisson, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 713 days.

(21) Appl. No.: 17/345,619

(22) Filed: Jun. 11, 2021

(65) Prior Publication Data

US 2022/0396363 A1 Dec. 15, 2022

(51) Int. Cl.
*G08G 5/34* (2025.01)
*H02J 7/00* (2006.01)
*H02J 7/14* (2006.01)

(52) U.S. Cl.
CPC ............. *G08G 5/34* (2025.01); *H02J 7/0063* (2013.01); *H02J 7/1446* (2013.01)

(58) Field of Classification Search
None
See application file for complete search history.

(56) References Cited

U.S. PATENT DOCUMENTS

| | | | |
|---|---|---|---|
| 8,209,101 B2 * | 6/2012 | Breit | H02J 3/14 701/80 |
| 9,296,288 B2 | 3/2016 | Galbraith | |
| 10,501,194 B2 | 12/2019 | Knapp et al. | |
| 10,773,812 B2 | 9/2020 | Terwilliger et al. | |
| 2016/0236790 A1 | 8/2016 | Knapp et al. | |
| 2017/0013061 A1 * | 1/2017 | Coulmeau | H04L 41/02 |

(Continued)

FOREIGN PATENT DOCUMENTS

CN 107211287 A 9/2017
EP 3772148 A1 2/2021
(Continued)

OTHER PUBLICATIONS

European Search Report Issued in European Application No. 22178725.2-1202 dated Oct. 24, 2022; 8 Pages.

(Continued)

*Primary Examiner* — Jason H Duger
(74) *Attorney, Agent, or Firm* — CANTOR COLBURN LLP

(57) ABSTRACT

Examples described herein provide a computer-implemented method for managing battery usage for a hybrid electric engine of an aircraft. The method includes receiving a flight plan comprising flight plan data for a flight of an aircraft. The method further includes receiving battery data about a battery system of the aircraft. The method further includes determining waypoints for when to apply electric power from the battery system based at least in part on the flight plan data and the battery data. The method further includes controlling, based at least in part on the waypoints, an electric motor while the flight plan is executed. The method further includes updating, while the flight plan is executed, the waypoints based at least in part on data received during the flight.

9 Claims, 9 Drawing Sheets

| Flight Phase | Efficiency Ratio ($$) | Engine Power Setting | Flight Condition | Priority |
|---|---|---|---|---|
| E-Taxi Out | 1000lbs /20kWh = 50 lbs / kWh | > Ground Idle < Max E-Motor Power | 0ft, ~0Mn | 1 |
| Takeoff | 20 lbs / kWh | Takeoff | 0ft, >0.4Mn | 3 |
| Step Climb 1 | 15 lbs / kWh | Climb | 5kft, 0.5Mn | 4 |
| Step Climb 2 | 12 lbs / kWh | Climb | 15kft, 0.6Mn | 5 |
| Step Climb 3 | 10 lbs / kWh | Climb | 25kft, 0.7Mn | 6 |
| Cruise | -25 lbs / kWh | Cruise/Flight Idle | 35kft, 0.8Mn | 99 |
| Decent | -67 lbs / kWh | Approach Idle | <35kft, <0.8Mn | 99 |
| E-Taxi In | 50 lbs / kWh | > Ground Idle < Max E-Motor Power | 0ft, ~0Mn | 2 |

(56) References Cited

U.S. PATENT DOCUMENTS

| | | | |
|---|---|---|---|
| 2019/0096269 A1* | 3/2019 | Sidiropoulos | G08G 5/0043 |
| 2020/0290742 A1* | 9/2020 | Kumar | B64D 27/24 |
| 2020/0346769 A1* | 11/2020 | Knapp | G08G 5/0034 |
| 2021/0070457 A1 | 3/2021 | Wiegman | |

FOREIGN PATENT DOCUMENTS

| | | |
|---|---|---|
| EP | 4101686 A1 | 12/2022 |
| JP | 2019121405 A | 7/2019 |

OTHER PUBLICATIONS

Office Action issued in European Patent Application No. 22178725.2; Date of Mailing Mar. 31, 2025 (4 pages).

\* cited by examiner

700

Receive Flight Plan Data For A Flight Of An Aircraft, The Flight Plan Data Including A Distance For An E-Taxi For The Aircraft And A Time Period For The E-Taxi For The Aircraft, Wherein A Hybrid Electric Engine Is Powered Entirely By A Battery During The E-Taxi
702

Receive Battery Data About A Battery Of The Aircraft, The Battery Data Comprising A Battery State Of Charge Throughout The Flight
704

Detect A Plurality Of Locations Of The Aircraft Throughout The Flight Using A Global Positioning Satellite (GPS)
706

Determine A Closest Safe Landing Location Relative To Each Of The Plurality Of Locations Of The Aircraft Throughout The Flight
708

Determine An Emergency Energy Reserve Requirement For The Closest Safe Landing Location Relative To Each Of The Plurality Of Locations Of The Aircraft Throughout The Flight, The Emergency Energy Reserve Requirement Being A State Of Charge For The Battery To Power The Aircraft To The Closest Landing Location
710

Maintain The State Of Charge Of The Battery Above The Emergency Energy Reserve Requirement For An Entirety Of The Flight
712

FIG. 7

HYBRID ELECTRIC ENGINE POWER DISTRIBUTION

BACKGROUND

The subject matter disclosed herein generally relates to turbine engines and, more particularly, to hybrid electric engine power distribution.

A hybrid electric gas turbine engine (or simply "hybrid electric engine") can use electricity and/or liquid fuel (e.g., jet fuel) to provide thrust to an aircraft. Hybrid electric engines can selectively use electricity or gas, depending, for example, on a flight stage, environmental conditions, and other concerns. For example, during times that require significant thrust (e.g., take off, climb, etc.), it may be more efficient to use liquid fuel to power the hybrid electric engine. However, at other times that require less thrust (e.g., taxi, cruise, descent, etc.), it may be more efficient to use electricity to power the hybrid electric engine.

BRIEF DESCRIPTION

According to an embodiment, a computer-implemented method for managing battery usage for a hybrid electric engine of an aircraft is provided. The method includes receiving a flight plan comprising flight plan data for a flight of an aircraft. The method further includes receiving battery data about a battery system of the aircraft. The method further includes determining waypoints for when to apply electric power from the battery system based at least in part on the flight plan data and the battery data. The method further includes controlling, based at least in part on the waypoints, an electric motor while the flight plan is executed. The method further includes updating, while the flight plan is executed, the waypoints based at least in part on data received during the flight.

In addition to one or more of the features described above or below, or as an alternative, further embodiments may include that determining the waypoints further includes: prioritizing the waypoints based at least in part on an amount of expected fuel savings.

In addition to one or more of the features described above or below, or as an alternative, further embodiments may include that the prioritizing is further based at least in part on a fuel price.

In addition to one or more of the features described above or below, or as an alternative, further embodiments may include that the prioritizing is further based at least in part on an efficiency ratio between fuel and electric power.

In addition to one or more of the features described above or below, or as an alternative, further embodiments may include that updating the waypoints includes: identifying a climb boost opportunity based at least in part on the data received during the flight and the battery data In addition to one or more of the features described above or below, or as an alternative, further embodiments may include that the flight plan data defines a plurality of flight events, wherein the plurality of flight events comprises a taxi out event, a takeoff event, a climb event, a cruise event, a descent event, and a taxi back event.

In addition to one or more of the features described above or below, or as an alternative, further embodiments may include that determining the waypoints comprises assigning a priority to each of the flight events relative to the other of the plurality of flight events.

According to an embodiment, a controller is provided that includes processing circuitry. The processing circuitry is configured to receive a flight plan comprising flight plan data for a flight of an aircraft. The processing circuitry is further configured to receive battery data about a battery system of the aircraft. The processing circuitry is further configured to determine waypoints for when to apply electric power from the battery system based at least in part on the flight plan data and the battery data. The processing circuitry is further configured to control, based at least in part on the waypoints, an electric motor while the flight plan is executed. The processing circuitry is further configured to update, while the flight plan is executed, the waypoints based at least in part on data received during the flight.

In addition to one or more of the features described above or below, or as an alternative, further embodiments may include that determining the waypoints further includes: prioritizing the waypoints based at least in part on an amount of expected fuel savings.

In addition to one or more of the features described above or below, or as an alternative, further embodiments may include that the prioritizing is further based at least in part on a fuel price.

In addition to one or more of the features described above or below, or as an alternative, further embodiments may include that the prioritizing is further based at least in part on an efficiency ratio between fuel and electric power.

In addition to one or more of the features described above or below, or as an alternative, further embodiments may include that updating the waypoints includes: identifying a climb boost opportunity based at least in part on the data received during the flight and the battery data.

In addition to one or more of the features described above or below, or as an alternative, further embodiments may include that the flight plan data defines a plurality of flight events, wherein the plurality of flight events comprises a taxi out event, a takeoff event, a climb event, a cruise event, a descent event, and a taxi back event, and wherein determining the waypoints comprises assigning a priority to each of the flight events relative to the other of the plurality of flight events.

According to an embodiment, a method for managing battery usage of a battery for a hybrid electric engine of an aircraft is provided. The method includes receiving flight plan data for a flight of the aircraft, the flight plan data including a distance for an e-taxi for the aircraft and a time period for the e-taxi for the aircraft, wherein the hybrid electric engine is powered entirely by the battery during the e-taxi. The method further includes receiving battery data about the battery for the hybrid electric engine of the aircraft, the battery data comprising a battery state of charge throughout the flight. The method further includes detecting a plurality of locations of the aircraft throughout the flight using a global positioning satellite (GPS). The method further includes determining a closest safe landing location relative to each of the plurality of locations of the aircraft throughout the flight. The method further includes determining an emergency energy reserve requirement for the closest safe landing location relative to each of the plurality of locations of the aircraft throughout the flight, the emergency energy reserve requirement being a state of charge for the battery to power the aircraft to the closest landing location. The method further includes maintaining the state of charge of the battery above the emergency energy reserve requirement for an entirety of the flight.

In addition to one or more of the features described above or below, or as an alternative, further embodiments may include maintaining the state of charge of the battery above a state of charge required for an etaxi event.

In addition to one or more of the features described above or below, or as an alternative, further embodiments may include maintaining the state of charge of the battery above a state of charge required for an etaxi for a portion of the flight.

In addition to one or more of the features described above or below, or as an alternative, further embodiments may include that the portion of the flight is after a start of a cruise portion.

In addition to one or more of the features described above or below, or as an alternative, further embodiments may include utilizing the battery to power the hybrid electric engine and auxiliary equipment of the aircraft until the state of charge drops to the emergency energy reserve requirement.

In addition to one or more of the features described above or below, or as an alternative, further embodiments may include recharging the battery when the state of charge of the battery is about equal to the emergency energy reserve requirement.

In addition to one or more of the features described above or below, or as an alternative, further embodiments may include maintaining the state of charge of the battery above the emergency energy reserve requirement by a critical use margin for the entirety of the flight.

BRIEF DESCRIPTION OF THE DRAWINGS

The following descriptions should not be considered limiting in any way. With reference to the accompanying drawings, like elements are numbered alike:

FIG. 7 depicts a flow diagram of a method for managing battery charging for a hybrid electric engine of an aircraft based on an energy reserve requirement and an e-taxi energy usage estimation according to one or more embodiments described herein.

DETAILED DESCRIPTION

A detailed description of one or more embodiments of the disclosed apparatus, system, and method are presented herein by way of exemplification and not limitation with reference to the Figures.

Figure 1A:
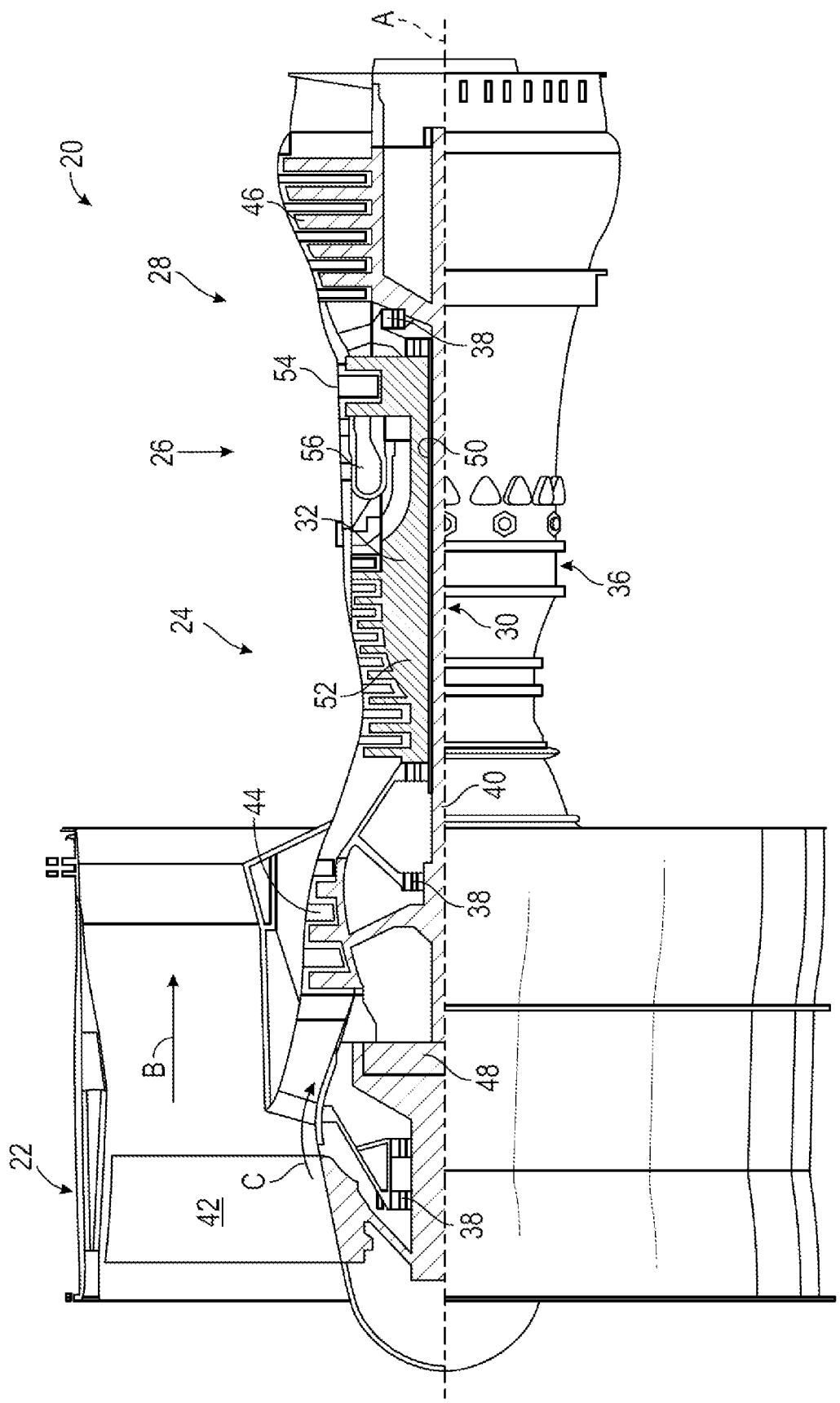
FIG. 1A is a partial cross-sectional view of a gas turbine engine according to one or more embodiments described herein.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition-- typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]0.5$. The "Low corrected fan tip speed" as disclosed herein according to one non-limiting embodiment is less than about 1150 ft/second (350.5 m/sec).

Figure 2:
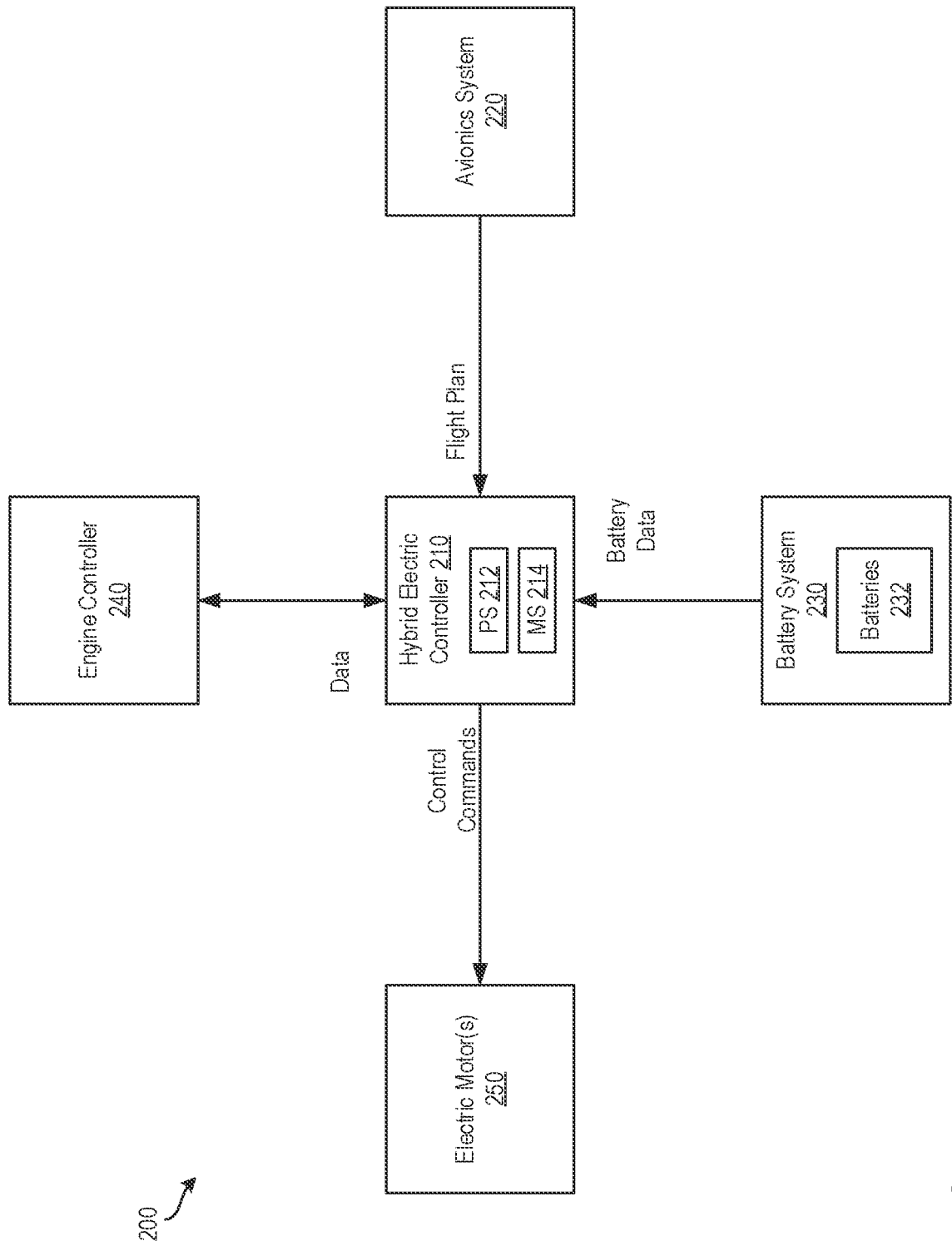
FIG. 2 is a block diagram illustrating a system for managing battery usage for a hybrid electric engine of an aircraft according to one or more embodiments described herein.

The gas turbine engine 20 can be coupled to an aircraft, as shown in FIG. 2, where the aircraft can include multiple instances of the gas turbine engine 20, which can be a hybrid electric turbine engine. Particularly, aircraft can be equipped with two or more hybrid electric turbine engines to provide thrust. Some gas turbine engines, such as hybrid electric gas turbine engines, are equipped with one or more electric machines to convert mechanical energy into electrical energy or vice versa. Two-spool hybrid electric engines can be configured with two electric machines: a first electric machine associated with the low speed spool and a second electric machine associated with the high speed spool. In the event of a failure of one of the electric machines, it may be desirable to distribute electricity from one of the other electric machines to a spool associated with the failed electric machine.

At various times throughout a flight, each engine has times it is adding extra power into its respective high speed spool using its respective high speed spool electric machine. At times, this extra power is obtained from the electric machine of the engine's low speed spool, for example as it extracts power from the low speed spool during an engine deceleration event. However, if the low speed spool's electric machine fails, it may be desirable to transfer power from another electric machine (from that engine or from another engine) as supplemental power. For example, if the low speed spool electric machine fails on a first engine, instead of using battery power, excess power from a second engine's low speed spool electric machine can be utilized. Similarly, if the high speed spool electric machine fails on the first engine when it is desirable to extract high-speed spool power, excess power from the first engine's low speed spool electric machine and/or excess power from another engine's low or high speed spool electric machine can be utilized. This can reduce the size and weight of one or more generators on an aircraft due to reduced power margin built into each unit specifically to handle failure modes. In addition, if an engine shuts down, electric power from an electric machine of another engine can be used to feed a fan on the failed engine (e.g., the engine that is shut down). As another example, if an engine shuts down, electric power from another engine can be used for the purpose of spooling up for relight (restart) as an alternative (or assist) to a windmilling relight.

Figure 1B:
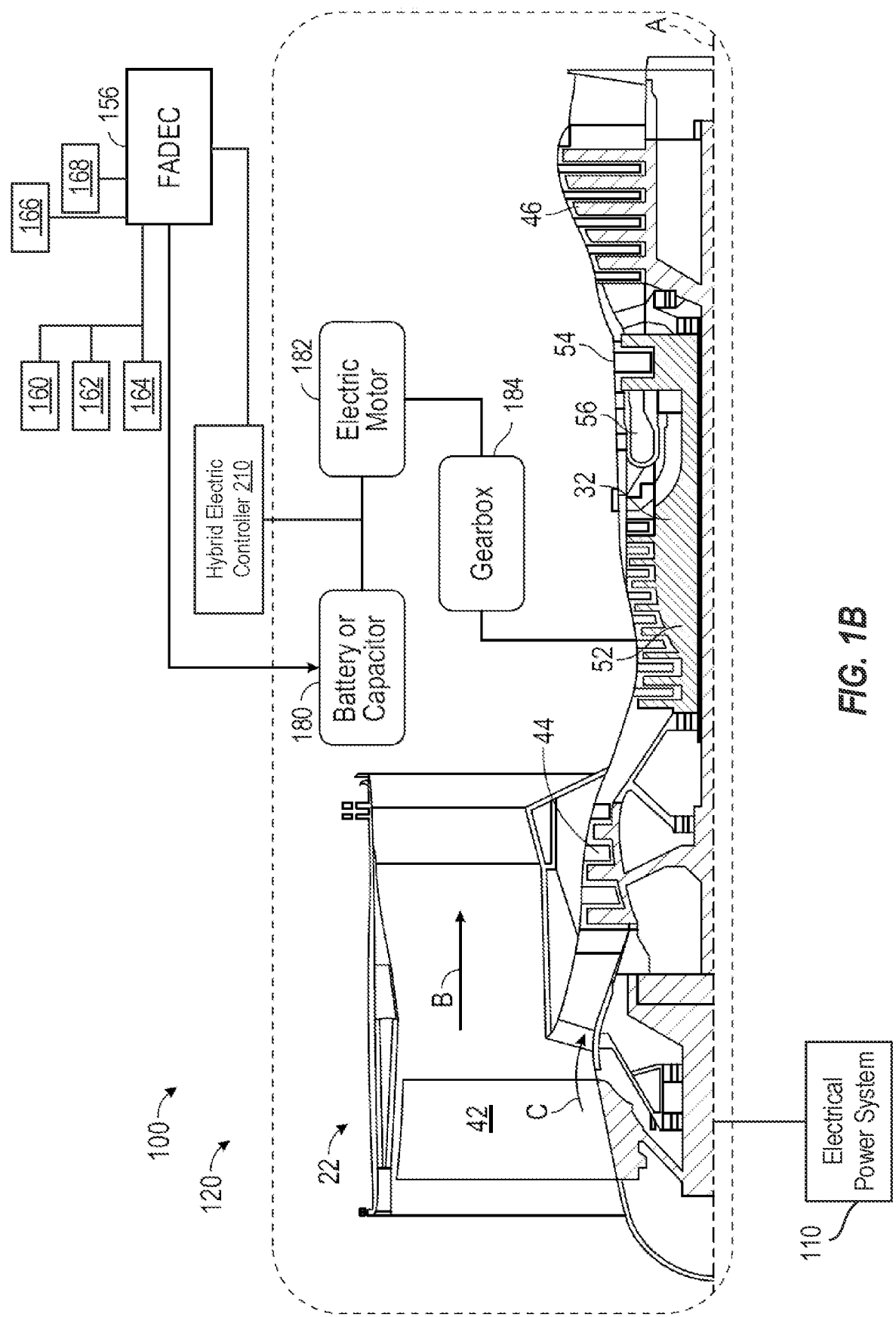
FIG. 1B is a partial cross-sectional view of a hybrid electric gas turbine engine according to one or more embodiments described herein.

FIG. 1B is a partial cross-sectional view of a hybrid electric gas turbine engine (also referred to as hybrid electric propulsion system 100) according to one or more embodiments described herein. The hybrid electric propulsion system 100 (also referred to as hybrid electric gas turbine engine 100) includes a gas turbine engine 120 operably coupled to an electrical power system 110 as part of a hybrid electric aircraft in accordance with one non-limiting embodiment of the present disclosure. In this embodiment, the engine 120 has a power source 180 such as a battery, a super capacitor, an ultra-capacitor or an equivalent thereof, which supplies power to a motor 182, which is connected to an engine accessory gearbox 184 that is operably coupled to the high speed spool 32 such that the motor 182, when operated will provide power assist to the high speed spool 32 via the accessory gearbox 184. In other words, the accessory gearbox will have at least one component (e.g., a gear train or other equivalent device) operably coupled to the high speed spool 32 and the motor 182 such that operation of the motor 182 will rotate the component which in turn will rotate the high speed spool 32. The power assist to the high speed spool 32 via the motor 182 will add enough stability to the high pressure compressor in order to allow, for example, re-starting without external power assist which may be provided by an auxiliary power unit (APU).

In one non-limiting embodiment, the motor 182 may be configured to provide power assist to the high speed spool 32. Alternatively, the motor 182 may be part of a different configuration or system configured to only provide power assist to the high speed spool 32 in order to expand an in-flight re-start envelope. In yet another example, the motor 182 may be configured to provide power assist to the low speed spool 30. For example, in an alternative embodiment, the motor 182 may be operatively coupled to the low speed spool 30 via accessory gearbox 184 in order to provide additional thrust to the engine 20.

According to an embodiment, the power source 180 and the motor 182 of the power assist system 186 are under the full authority of a full authority digital engine control (FADEC) 156, which controls the power source and the engine. The FADEC 156 is an example of a controller that can include a processing system 160, a memory system 162, and an input/output interface 164. The processing system 160 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the FADEC 156 can be said to include processing circuitry. The memory system 162 can store data and instructions that are executed by the processing system 160. In embodiments, the memory system 162 may include random access memory (RAM), read only memory (ROM), or other electronic, optical, magnetic, or any other computer readable medium onto which is stored data and algorithms in a non-transitory form. The input/output interface 164 is configured to collect sensor data from the one or more system sensors and interface with various components and subsystems, such as components of motor drive electronics, rectifier electronics, an energy storage management system, an integrated fuel control unit, actuators, and/or other components of the hybrid electric propulsion system 100. The FADEC 156 provides a means for controlling hybrid electric system control effectors 168 based on a power transfer control 166 that is dynamically updated during operation of the hybrid electric propulsion system 100. The means for controlling the hybrid electric system control effectors 168 can be otherwise subdivided, distributed, or combined with other control elements.

The FADEC 156 can also include various operational controls, such as a power transfer control that controls hybrid electric system control effectors. The power transfer control 166 can apply control laws and access/update models to determine how to control and transfer power to and from the hybrid electric system control effectors 168. For example, sensed and/or derived parameters related to speed, flow rate, pressure ratios, temperature, thrust, and the like can be used to establish operational schedules and transition limits to maintain efficient operation of the gas turbine engine 120.

Additionally or alternatively, the hybrid electric propulsion system 100 can include a hybrid electric controller 210, which may be integrated into or separate from the FADEC 156. The hybrid electric controller 210 is communicatively coupled to the power source 180, the motor 182, and/or any other suitable components. The features and functionality of the hybrid electric controller 210 are described in more detail herein with respect to FIG. 2.

An aircraft can selectively power a hybrid electric engine, such as the hybrid electric gas turbine engine 100 of FIG. 1B, by providing electric power from a battery source and/or liquid fuel (jet fuel). During certain stages during a flight plan (e.g., taxi, cruise), electric power may be more efficient. However, during other stages (e.g., takeoff, climb), it may be more efficient to power the engine with liquid fuel. For example, during taxi, electric power may be more efficient, and thus the battery may be utilized to power the hybrid electric engine during taxi.

One or more embodiments described herein relate to managing battery usage for a hybrid electric engine of an aircraft based on a flight plan and/or data received during the flight. Additionally and/or alternatively, one or more embodiments described herein relate to managing battery charging for a hybrid electric engine of an aircraft based on an energy reserve requirement and an e-taxi energy usage estimation. Appropriate management of battery charging and discharging allows for the removal of ram-air turbines (RAT), which are conventionally used to provide power to auxiliary flight systems and charge battery systems. Removing the RAT system improves aircraft performance by removing weight from the aircraft.

Referring now to FIG. 2, with continued reference to FIGS. 1A and 1B, FIG. 2 is a block diagram illustrating a system 200 for managing battery usage for a hybrid electric engine of an aircraft according to one or more embodiments described herein. The system 200 includes a hybrid electric controller 210 that is communicatively coupled to an avionics system 220, a battery system 230, an engine controller 240, and electric motor(s) 250. Although not shown, it should be appreciated that one or more of the avionics system 220, the battery system 230, the engine controller 240, and the electric motor(s) 250 can be communicatively coupled directly or indirectly together independent of the hybrid electric controller 210.

The hybrid electric controller 210 can include a processing system (PS) 212 and a memory system (MS) 214. The processing system 212 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the hybrid electric controller 210 can be said to include processing circuitry. The memory system 214 can store data and instructions that are executed by the processing system 212. In embodiments, the memory system 214 may include random access memory (RAM), read only memory (ROM), or other electronic, optical, magnetic, or any other computer readable medium onto which is stored data and algorithms in a non-transitory form.

The hybrid electric controller 210 receives flight plan data for a flight plan from the avionics system 220. The flight plan defines an aircrafts planned route or flight path. Examples of flight plan data include, for example, departure and arrival locations, estimated flight time, planned cruising speed and altitude, etc. The hybrid electric controller 210 also receives battery data from the battery system 230. The battery data indicates how much electric power (e.g., a number of kilowatt hours of electric power) is available from one or more batteries 232 associated with the battery system 230. The hybrid electric controller 210 determines waypoints, as further described herein, for when to apply electric power from the battery system to the electric motor(s) 250 based at least in part on the flight plan data and the battery data. The electric motor(s) 250 can include any suitable electric motor, such as the electric motor 182 of FIG. 1B, which can provide power assist to the low speed spool 30 and/or the high speed spool 32 of the gas turbine engine 120.

The hybrid electric controller also receives data from the engine controller 240, which is an example of the FADEC 156 of FIG. 1B. The data represents data about the aircraft, such as avionics information (which can alternatively and/or additionally be received directly from the avionics system 220), engine power settings, etc. The hybrid electric controller 210 can also send data and/or commands to the engine controller 240, such as to cause the engine controller 240 to control one or more aspects of the hybrid electric propulsion system 100.

Figure 3:
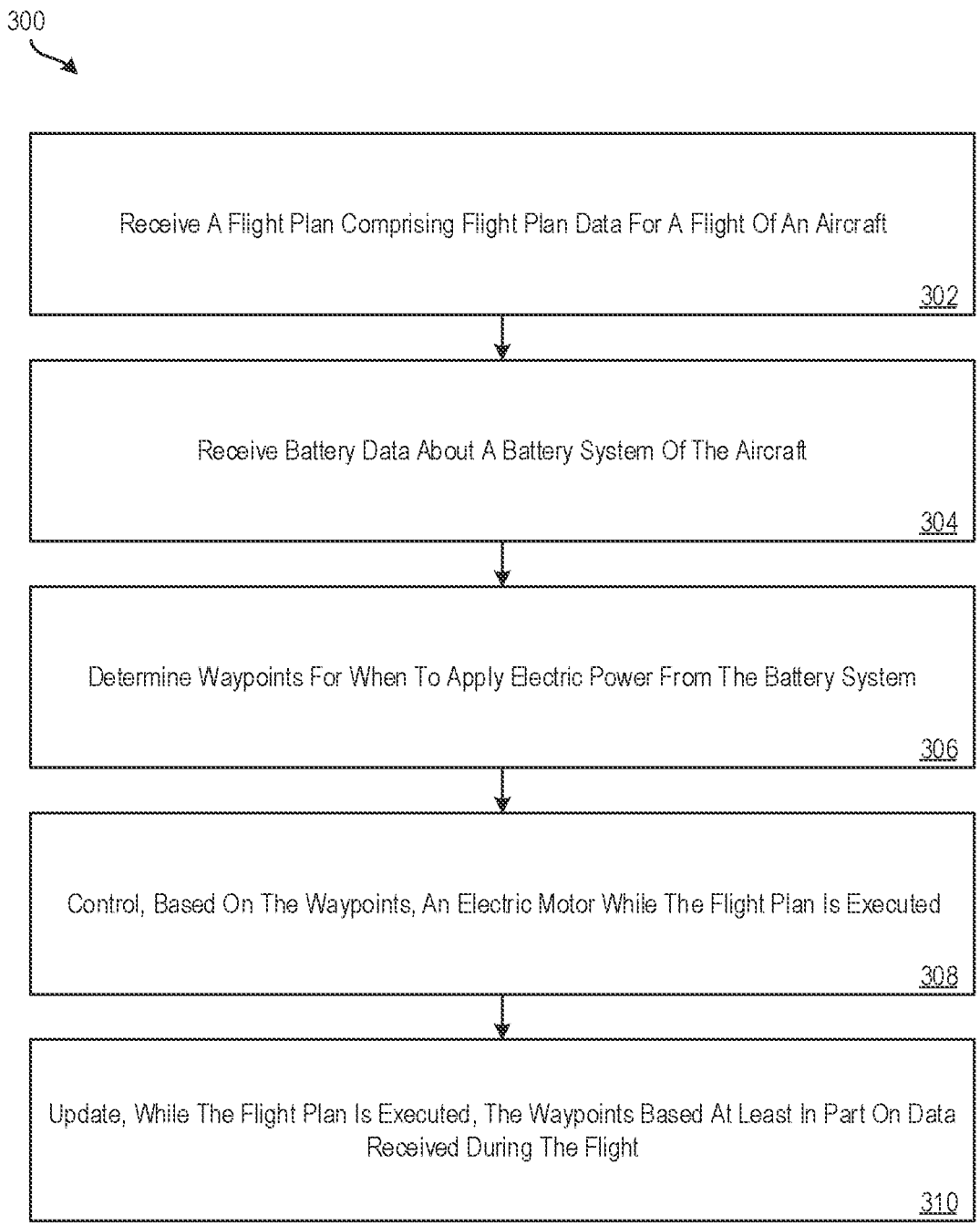
FIG. 3 is a flow chart of a method for managing battery usage for a hybrid electric engine of an aircraft according to one or more embodiments described herein.

FIG. 3 is a flow chart illustrating a method for managing battery usage for a hybrid electric engine of an aircraft according to one or more embodiments described herein. The method 300 may be performed, for example, by the hybrid electric controller 210 and/or another suitable device.

At block 302, the hybrid electric controller 210 receives (such as from the avionics 220) a flight plan comprising flight plan data for a flight of an aircraft. The flight plan data can define parameters of the flight, including length of e-taxi out, takeoff, climb, cruise, decent, e-taxi in, target power settings, and the like. As an example, the target power settings can be derived based on target altitude, calibrated airspeed, climb rate, etc. At block 304, the hybrid electric controller 210 receives battery data from the battery system 230 of the aircraft. The battery data indicates a total amount of electric power (e.g., kWh) available from the battery system 230.

Figure 4:
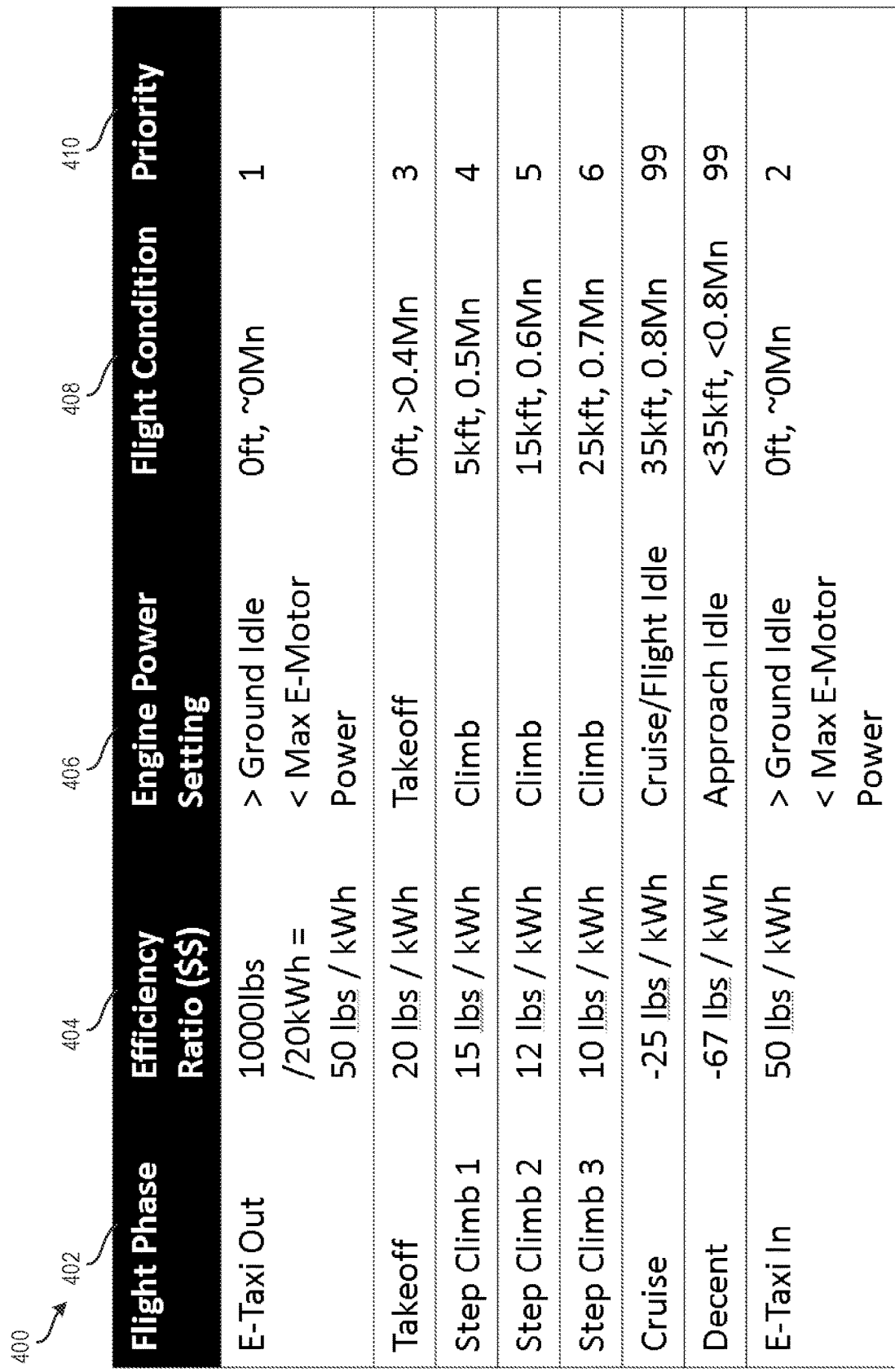
FIG. 4 depicts an efficiency table according to one or more embodiments described herein.

Using the flight plan data and the battery data, the hybrid electric controller 210 determines waypoints. For example, at block 306, the hybrid electric controller 210 determines waypoints for when to apply electric power from the battery system based at least in part on the flight plan data and the battery data. The waypoints define when to use electric power for fuel savings, when to fuel power for battery savings, and/or when to charge the batteries. The waypoints can be determined based on a prioritization. For example, the hybrid electric controller 210 prioritizes highest efficiency opportunities to trade off electric power for fuel savings. This can be done by calculating an efficiency ratio (e.g., lbs fuel/kWh batt). In such an example, a higher efficiency ratio defines waypoints that are higher priority relative to a lower efficiency ratio. FIG. 4 depicts an efficiency table 400 according to one or more embodiments described herein.

As can be seen in FIG. 4, the efficiency table 400 includes the following columns: flight phase 402, efficiency ratio 404, engine power setting 406, flight condition 408, and priority. For example, electric-taxi (e-taxi) out has an efficiency ratio of 1000 lbs of fuel/20 kWh of electric power. This results in an efficiency ration of 50 lbs/kWh. Efficiency ratios of the other flight phases can be similarly calculated. A priority can then be assigned based on the efficiency ratio. For example, e-taxi out and e-taxi in each have relatively high efficiency values compared to the other flight phases and thus they are assigned a higher priority (denoted by the priority values "1" and "2" respectively).

Other examples of prioritizing the waypoints can include prioritizing based on a fuel price, based on an amount of fuel expected ,based on an engine power setting, based on a flight condition, based on an emergency condition, etc.

With continued reference to FIG. 3, at block 308, the hybrid electric controller 210 controls, based at least in part on the waypoints, the electric motor(s) 250 while the flight plan is executed. That is, the hybrid electric controller 210 causes (directly and/or indirectly), the electric motor(s) 250 to engage and/or disengage at certain times during the flight based on the waypoints. For example, the hybrid electric controller 210 applies electrical assist (e.g., electric power from the battery system 230 to the electric motor(s) 250) as the flight plan is executed. This can be accomplished using data received during the flight (e.g., avionics information, engine power settings, etc.) to determine where in the flight plan the aircraft currently is.

At block 310, the hybrid electric controller 210 updates, while the flight plan is executed, the waypoints based at least in part on data received during the flight. The data received during the flight can include data received from the avionics system 220, the engine controller 240, from the battery system 230, etc. As an example, the hybrid electric controller 210 monitors and responds to the data received during the flight. For example, if the flight plan changes, the hybrid electric controller 210 reassess the waypoints based on the data received during the flight (e.g., amount of electric power remaining in the battery system (ex: if there is not enough electric power to perform a full electric-taxi back to the gate upon arrival, use the electric power for climb assist during flight), air traffic control (ATC) data for taxi times (e.g., receiving data about airport taxi times and including that in the calculation), historical taxi data, current and/or historical weather data, etc.). Waypoints can be deleted, added, and/or modified based on the data received during the flight. According to one or more embodiments described herein, updating the waypoints includes identifying a climb boost opportunity based at least in part on the data received during the flight and the battery data (see, e.g., FIG. 5).

While the above description has described the flow process of FIG. 3 in a particular order, it should be appreciated that unless otherwise specifically required in the attached claims that the ordering of the steps may be varied.

An advantage of one or more embodiments described herein is that substantially all of the electric power stored in the battery system is used during flight/taxi so that the extra weight introduced by the batteries is used as efficiently as possible. Another advantage of one or more embodiments described herein is the ability to use data received during the flight to adjust when and how much electric power to use. Another advantage of one or more embodiments described herein is that maintenance periods can be extended because the gas turbine engine is using battery power for more of the flight. Another advantage of one or more embodiments described herein is improved rotor lifting for smaller aircraft with more transients.

Figure 5:
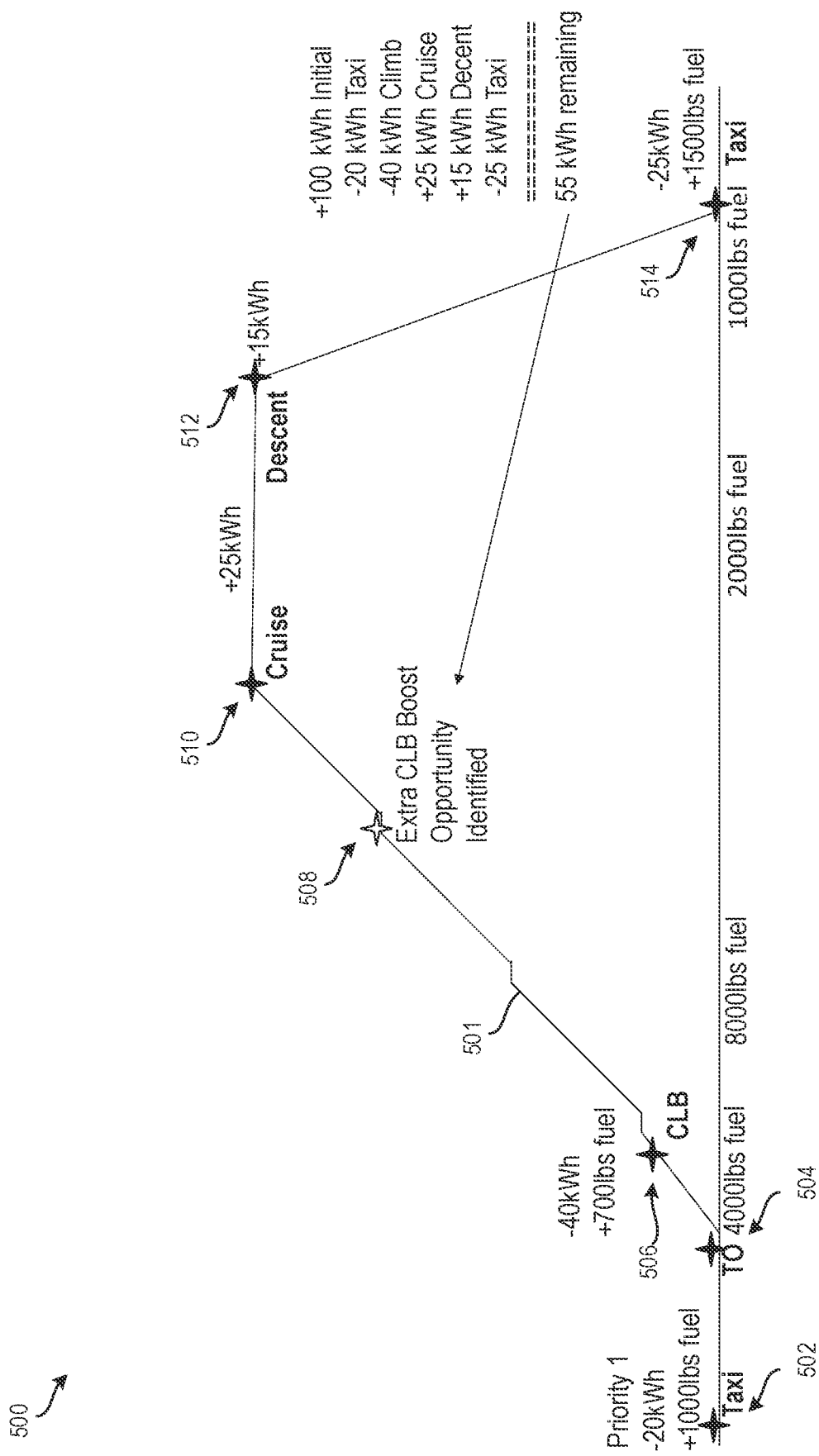
FIG. 5 depicts an example graph of a flight plan including a climb boost opportunity according to one or more embodiments described herein.

FIG. 5 depicts an example graph 500 of a flight plan 501 including a climb boost opportunity according to one or more embodiments described herein. A climb boost opportunity occurs when excess electric power is determined to exist. That is, more electric power is stored in the battery system 230 than is needed during the flight. Accordingly, this excess electric power can be used during a climb stage of the flight plan.

As can be seen in the example of FIG. 5, waypoints for various stages of the flight plan 501 are determined by the hybrid electric controller 210. The waypoints include taxi out waypoint 502, takeoff waypoint 504, climb waypoint 506, climb boost waypoint 508, cruise waypoint 510, descent waypoint 512, and taxi back waypoint 514. The waypoints 502, 504, 506, 508, 510, 512, 514 are determined from the flight plan data. The hybrid electric controller 210 performs a calculation, as shown in FIG. 5, to determine an amount of remaining electric power when taking into account the electric power consumed and generated during the various phases of the flight. In this example, 100 kWh are initially present in the battery system 230. The taxi phases consume 20 kWh and 25 kWh, and the climb phase consumes 40 kWh. The cruise and descent stages generate 25 kWh and 15 kWh respectively. This results in a net excess of 55 kWh that will remain at the end of the flight. Part or all of this excess can be used to provide an extra climb boost, which is represented by the climb boost waypoint 508. That is, excess electric power is provided to the electric motor during the climb phase at the waypoint 508 to provide an extra climb boost. This electric power would otherwise go unused.

In this example, the hybrid electric controller 210 sets waypoints (as shown) based on the flight plan data (e.g., taxi, take off, climb, cruise, decent, and taxi information) and the available 100 kWh electric power. The hybrid electric engine control system calculates the electric power usage/generation and determines that 55 kWh of power remains based on the projected electric power usage/generation. Thus, the hybrid electric controller 210 identifies an additional opportunity to apply electric power assist via the electric motor(s) 250 to perform an extra climb boost as shown (e.g., waypoint 508). This provides for the electric power stored in the battery system 230 to be used and not wasted.

Figure 6:
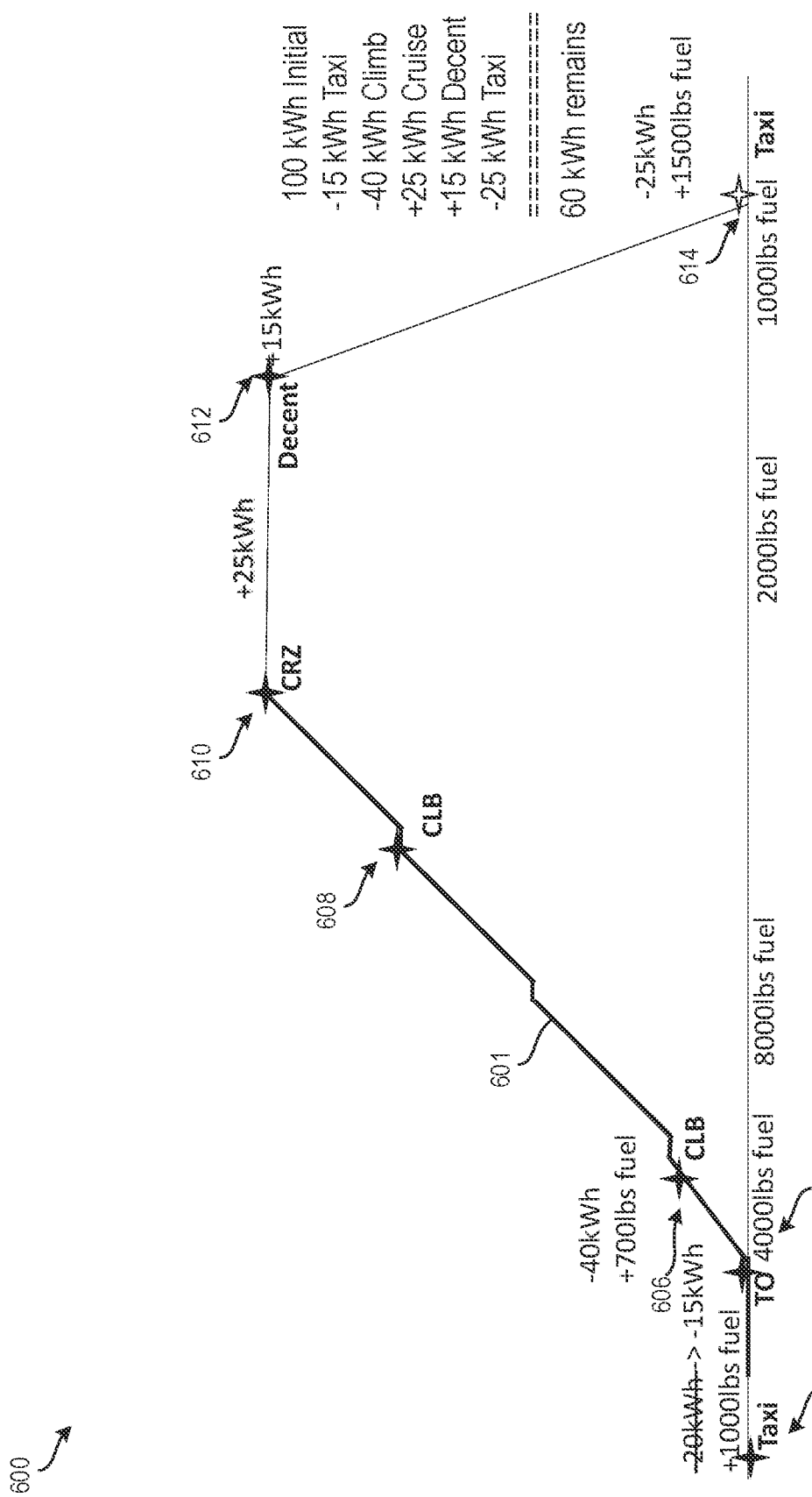
FIG. 6 depicts an example graph respectively of flight plan and a deviated flight plan according to one or more embodiments described herein.

FIG. 6 depicts an example graph 600 of a deviated flight plan according to one or more embodiments described herein. As described herein, the hybrid electric controller 210 monitors data received during the flight and can update waypoints (e.g., one or more of waypoints 602, 604, 606, 608, 610, 612, 614) based on the data received during the flight. For example, if more electric power is used or generated during a particular segment of a flight, the other waypoints can be updated accordingly. As one such example, as shown in FIG. 6, a shorter taxi out, shown at waypoint 602, can result in excess electric power available for other stages of the flight. In this example, only 15 kWh of electric power was used during taxi out instead of the anticipated 20 kWh because of a shorter taxi out. The hybrid electric controller 210 confirms extra energy expected in the battery system 230 and re-calculates the remaining waypoints 604, 606, 608, 610, 612, 614. FIG. 6 shows the re-calculation of the energy usage/generation estimates revised to account for the shortened taxi out event as compared to the example of FIG. 5. In this example, because of the shortened taxi out event, 60 kWh remains.

According to one or more embodiments described herein, the hybrid electric controller 210 manages battery charging for a hybrid electric engine of an aircraft based on an energy reserve requirement and an e-taxi energy usage estimation.

According to an example, flight plan data from a flight plan is loaded into the hybrid electric controller 210. The flight plan data can define parameters of the flight, including length of e-taxi (electric-taxi) out, takeoff, climb, cruise, decent, e-taxi in, etc. The location of the aircraft is continuously monitored throughout the flight and a closest safe landing location (e.g., closest airport) is continuously determined throughout the flight.

An emergency energy reserve requirement (EERR) is continuously calculated based on the location of the aircraft, a distance to a closest safe landing location (e.g., closest airport), and a projected flight path to the closest safe landing location (e.g., powered flight and/or controlled glide). The EERR is the amount of power required in the battery to safely reach the closest safe landing location based on the projected flight path to the closed safest landing location. The magnitude of the EERR will change throughout the flight based on where the aircraft is located. For example, once on the ground the EERR may be zero because the aircraft is already safely on the ground. However, if the aircraft is over an ocean, the EERR may be higher because it will take longer to reach the coastline and land safely on the ground.

A controller, such as the hybrid electric controller 210, manages dissipation of electricity from the battery system 230 to ensure that the energy within the battery system 230 is always at or above the EERR throughout the flight. According to one or more examples, a critical use margin is added on top of the EERR to provide the pilot with some flexibility in energy usage during the decent to the closest safe landing location. That is, the critical use margin acts as a buffer on top of the EERR.

The EERR may be a first state of charge to maintain in the battery system 230. The controller is also configured to simultaneously manage a second state of charge in the battery system 230 to ensure that the battery system 230 contains enough electrical power to power the hybrid electric engine (e.g., the electric motor(s) 250) for e-taxi in. The second state of charge in the battery system 230 may vary based on the length of the e-taxi in both time of day, distance to taxi, duration of taxi, etc.

According to one or more embodiments described herein, the hybrid electric controller 210 causes the battery system 230 to be charged for e-taxi after beginning of cruise, when it is most efficient to charge the battery system 230.

FIG. 7 depicts a flow diagram of a method 700 for managing battery charging for a hybrid electric engine of an aircraft based on an energy reserve requirement and an e-taxi energy usage estimation according to one or more embodiments described herein. The method 700 may be performed, for example, by the hybrid electric controller 210 and/or another suitable device.

At block 702, the hybrid electric controller 210 receives flight plan data for a flight of the aircraft. According to an example, the flight plan data includes a distance for an e-taxi for the aircraft and a time period for the e-taxi for the aircraft. The hybrid electric engine is powered entirely by the battery during the e-taxi.

At block 704, the hybrid electric controller 210 receives battery data about the battery system 230 of the aircraft. The battery data includes a battery state of charge throughout the flight.

At block 706, the hybrid electric controller 210 detects a plurality of locations of the aircraft throughout the flight using a global positioning satellite (GPS). That is, at various times, the location of the aircraft is determined during the flight.

At block 708, the hybrid electric controller 210 determines a closest safe landing location relative to each of the plurality of locations of the aircraft throughout the flight. For example, at a first location, a closest safe landing location (e.g., an airport) is determined. Similarly, at a second location, a closest landing location is determined, which can be the same as or different than the closest safe landing location relative determined for the first location of the aircraft.

At block 710, the hybrid electric controller 210 determines an emergency energy reserve requirement (EERR) for the closest safe landing location relative to each of the plurality of locations of the aircraft throughout the flight. As described herein, the EERR is a required state of charge for the battery system 230 to power the aircraft to the closest landing location for a particularly location of the aircraft of the plurality of locations of the aircraft. Thus, the EERR can change throughout the flight as different of the plurality of locations are used to determine the closest safe landing location.

At block 712, the hybrid electric controller 210 maintains the state of charge of the battery above the emergency energy reserve requirement for an entirety of the flight.

In some examples, the hybrid electric controller 210 maintains the state of charge of the battery above a state of charge required for an e-taxi. This can be done for a portion of the flight and/or for all of the flight. In the case that it is maintained for a portion of the flight, the portion of the flight is after a start of a cruise portion of the flight.

In some examples, the hybrid electric controller 210 utilizes the battery system 230 to power the electric motor(s) 250 and auxiliary equipment of the aircraft until the state of charge drops to the EERR.

In some examples, the hybrid electric controller 210 causes the battery system 230 to recharge when the state of charge of the battery system 230 is about equal to the EERR.

In some examples, the hybrid electric controller 210 maintains the state of charge of the battery system 230 above the EERR by a critical use margin for the entirety of the flight. In other examples, the hybrid electric controller 210 maintains the state of charge of the battery system 230 above the EERR by a critical use margin for a predetermined portion of the flight.

Figure 8:
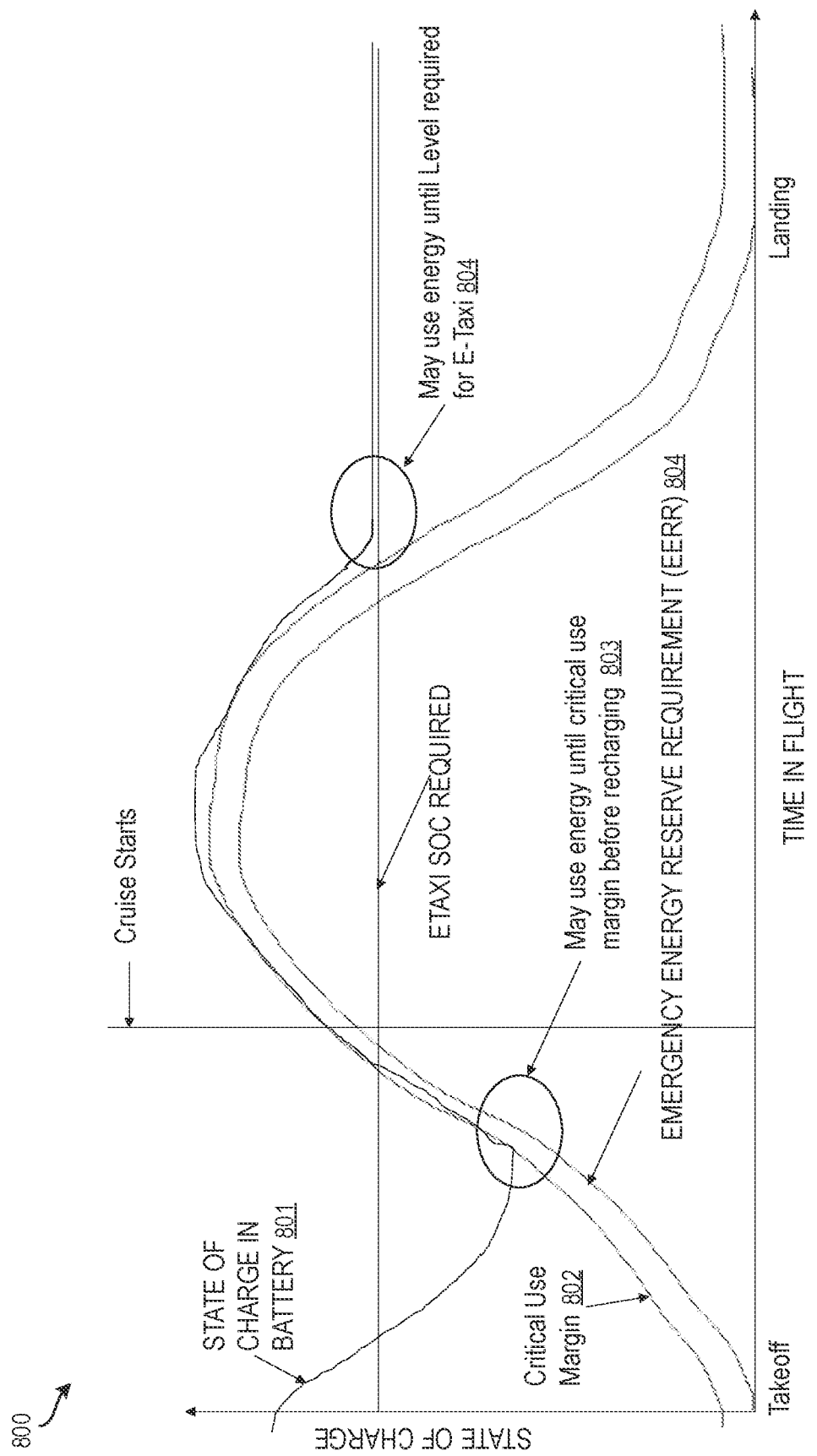
FIG. 8 depicts an example graph of a state of charge of the battery system relative to the time in flight of the aircraft according to one or more embodiments described herein.

FIG. 8 depicts an example graph 800 of a state of charge of the battery system 230 relative to the time in flight of the aircraft according to one or more embodiments described herein. As shown in this example, the state of charge 801 in the battery drops after takeoff until it reaches a critical use margin 802 at 803. The critical use margin 802 is a threshold amount greater than the EERR 804, which is also shown on the graph 800. The battery is charged, as shown by the state of charge 801 in the battery, once the critical use margin 802 is hit at 803, and the state of charge in the battery 801 is maintained until the level for e-taxi is reached 805. This provides for an energy reserve requirement to be satisfied that provides safety and redundancy without requiring conventional RAT systems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for managing battery usage for a hybrid electric engine of an aircraft, the method comprising:
   receiving a flight plan comprising flight plan data for a flight of an aircraft;
   receiving battery data about a battery system of the aircraft;
   determining waypoints for when to apply electric power from the battery system based at least in part on the flight plan data and the battery data;
   controlling, based at least in part on the waypoints, an electric motor while the flight plan is executed; and
   updating, while the flight plan is executed, the waypoints based at least in part on data received during the flight, wherein determining waypoints further comprises prioritizing the waypoints at least in part on a calculated efficiency ratio between fuel saved and electric power used, calculated as lbs of fuel/kWh of electric power.

2. The method of claim 1, wherein the prioritizing is further based at least in part on a fuel price.

3. The method of claim 1, wherein updating the waypoints comprises:
   identifying a climb boost opportunity based at least in part on the data received during the flight and the battery data.

4. The method of claim 1, wherein the flight plan data defines a plurality of flight events, wherein the plurality of flight events comprises a taxi out event, a takeoff event, a climb event, a cruise event, a descent event, and a taxi back event.

5. The method of claim 4, wherein determining the waypoints comprises assigning a priority to each of the plurality of flight events relative to the other of the plurality of flight events based upon the prioritizing the waypoints step.

6. A controller comprising processing circuitry to:
   receive a flight plan comprising flight plan data for a flight of an aircraft;
   receive battery data about a battery system of the aircraft;
   determine waypoints for when to apply electric power from the battery system based at least in part on the flight plan data and the battery data;
   control, based at least in part on the waypoints, an electric motor while the flight plan is executed; and
   update, while the flight plan is executed, the waypoints based at least in part on data received during the flight wherein determining waypoints further comprises prioritizing the waypoints at least in part on a calculated efficiency ratio between fuel saved and electric power used, calculated as lbs of fuel/kWh of electric power.

7. The controller of claim 6, wherein the prioritizing is further based at least in part on a fuel price.

8. The controller of claim 6, wherein updating the waypoints comprises:
   identifying a climb boost opportunity based at least in part on the data received during the flight and the battery data.

9. The controller of claim 6, wherein the flight plan data defines a plurality of flight events, wherein the plurality of flight events comprises a taxi out event, a takeoff event, a climb event, a cruise event, a descent event, and a taxi back event, and wherein determining the waypoints comprises assigning a priority to each of the plurality of flight events relative to the other of the plurality of flight events based upon the prioritizing the waypoints step.

* * * * *